United States Patent [19]

Schoppers

[11] Patent Number: 5,392,382
[45] Date of Patent: Feb. 21, 1995

[54] AUTOMATED PLAN SYNTHESIZER AND PLAN EXECUTION METHOD

[76] Inventor: Marcel J. Schoppers, 166 Springdale Way, Redwood City, Calif. 94062

[21] Appl. No.: 983,836
[22] Filed: Dec. 1, 1992
[51] Int. Cl.$^6$ ............................................. G06F 15/18
[52] U.S. Cl. ...................................... 395/10; 395/81; 395/82; 395/85
[58] Field of Search ....................... 395/10, 11, 22, 81, 395/82, 85

[56] References Cited

U.S. PATENT DOCUMENTS

| | | | |
|---|---|---|---|
| 4,697,242 | 9/1987 | Holland et al. | 395/10 |
| 5,025,499 | 6/1991 | Inoue et al. | 395/10 |
| 5,195,172 | 3/1993 | Elad et al. | 395/10 |
| 5,202,955 | 4/1993 | Hamilton et al. | 395/10 |
| 5,214,745 | 5/1993 | Sutherland | 395/22 |

OTHER PUBLICATIONS

Y. Ishida, "An Application of Qualitative Reasoning to Process Diagnosis; Automatic Rub Generation by Qualitative Simulation"; 4th Conf. on AIAPP., Mar. 14–18, 1988, pp. 124–129.

"Representation and Automatic Synthesis of Reaction Plans"; M. J. Schoppers; Thesis submitted to the Graduate College of the University of Illinois; 1989.

"STATIC A Problem-Space Compiler for PRODIGY"; O. Etzion; Dept. of Computer Science & Engineering, Univ. of Washington; AAAI NCAI '91; pp. 533–540.

Dawson & Silkiossy, "The Role of Preprocessing in Problem Solving Systems"; Proceedings of the Int. Joint. Conf. on Artificial Intelligence (IJCAI), 1977.

Irani & Cheng, "Subgoal Ordering and Goal Augmentation For Heuristic Problem Solving"; Proceedings of the IJCAI, 1987.

"The Role of Preprocessing In Problem Solving Systems"; C. Dawson & L. Siklossy; Univ of Texas, Dept. of Comp. Science; Problem-Solving-3; pp. 465–471.

"Subgoal Ordering and Goal Augmentation For Heuristic Problem Solving"; K. Irani & J. Cheng; Robot Systems Division, EE & CS Dept, Univ. of Michigan; REASONING; pp. 1018–1024.

*Primary Examiner*—Allen R. MacDonald
*Assistant Examiner*—Tariq Hafiz
*Attorney, Agent, or Firm*—Flehr, Hohbach, Test, Albritton & Herbert

[57] ABSTRACT

A reactive planning system automatically generates a universal plan for achieving specified goals. The universal plan is derived from a set of primitive and deductive rules governing operation of one or more actuators, and the specified goals. The universal plan contains tree structure defining predicates, actions and subplans for achieving the specified goals, and subgoals of those goals. Also included in the universal plan generated by the system are a set of confinement rules which determine the proper order for achieving unmet goals. During operation of the system, after the universal plan has been formulated, a plan interpreter or executer determines the subgoals that have yet to be met, and then selects one or more subgoals as being the appropriate ones to be worked on at the current time. More particularly, to select a goal or subgoal for processing, the plan executer first determines the set of goals that are currently achievable, which is the set of goals for which all preconditions and subgoals have been met. Then all the confinement rules in the universal plan are scanned to determine which of those rules are applicable to the goals that are currently achievable. Application of the confinement rules evaluates all interactions between subplans and determines what goals are protectable and thus can be achieved without causing a conflict between subplans.

16 Claims, 6 Drawing Sheets

AUTOMATED PLAN SYNTHESIZER AND PLAN EXECUTION METHOD

The present invention relates generally to robotics systems and other types of systems which will automatically accomplish a specified goal without being specifically instructed as to the sequence of steps required to accomplish the specified goal.

BACKGROUND OF THE INVENTION

Planning synthesizers and the methodologies used to automatically develop plans are typically considered to be in that domain of computer science known as "artificial intelligence".

Most prior art automated plan synthesizers develop plans that are procedural in nature. This means that such programs assume that if the internal state of the plan execution system is known, then there is a single action (sometimes called a "possible future") that will best advance the system toward its goal. Such plan synthesizing systems generally do not allow for unexpected events in the external world, and thus are not "reactive".

Benchmark Reactive Planning Problem: Blocks-and-Baby Problem

The domain of problems addressed by the present invention are exemplified by the following benchmark problem: The subset of the world in which the planning system operates is a flat table with a number of cubical blocks of unknown size that can be stacked on each other. A robot arm with a hand is our only means of moving blocks, and the goal of the robot is to build a tower of blocks: A on B on C. Only one block can be put directly on top of any other block. Also on the table is a mischievous baby who will flatten block towers, snatch blocks out of the robot's hand, and even throw blocks at the robot. The robot may not snatch blocks back, may not touch the baby, and cannot keep anything out of the baby's reach. As partial compensation, we are given an unlimited set of sensing devices. The problem is to devise a software planning program enabling the robot to cope efficiently with this domain.

In general, the task of determining what to do next can be undertaken either before or after the arrival of the situation to which an action is addressed. The work (i.e., planning) must be done sometime, but if the problems can be solved after-the-fact they need not be solved in advance, and vice versa. Hence there is a complementarily between predictive planning and perceptive reaction.

The blocks-and-baby problem posed above could not be worse from the viewpoint of predictive planning: there is nothing the baby cannot do to the robot. Consequently the present invention is a reactive planning and plan execution system.

The most relevant prior art known to the inventor is the inventor's own Ph.D. thesis, "Representation and Automatic Synthesis of Reaction Plans," by Marcel Joachim Schoppers, Graduate College of the University of Illinois at Urbana—Champaign (1989), which is hereby incorporated by reference. The Schoppers Ph.D. thesis describes how to automatically synthesize and execute reaction plans, including plans suitable for blocks-and-baby problem described above. In the Schoppers Ph.D. thesis, the programmer defines the primitives for a particular physical system and set of actuators, and a corresponding set of applicable "confinement rules" are generated. A confinement rule is a rule which specifies the proper order for achieving any two unmet goals. However, the Schoppers Ph.D. thesis is incomplete, and in fact, partially incorrect, because it does not teach how to automatically determine the correct order for selecting and attempting to achieve three or more subgoals of a given goal. The inventor has determined that additional confinement rules, beyond those described in his thesis, are required to avoid potential conflicts between subplans, and that a new methodology is required to properly apply the confinement rules so as to achieve the plan's goals without unnecessarily taking actions that will have to be undone at a later time.

The Schoppers PhD thesis also makes confinement rules much more influential than they should be. The thesis describes confinement rules as ordering not just individual goals, but whole plans: when one goal is ordered before a second, all of the first goal's subgoals, sub-subgoals, and so on, are also ordered before the second goal. This prevents much useful parallelism in plan execution, and also makes the synthesis and use of confinement rules more complicated than it needs to be. The Schoppers thesis knows of these drawbacks but does not propose a solution.

In the Schoppers PhD thesis, the synthesis of confinement rules is not only unnecessarily complicated, it is also incorrect in that, under some conditions, a confinement rule can be determined to be relevant when in fact it is not. That is, a confinement rule's qualifier can be true at a time when there is no need to use the rule, thus ordering goals when they need not be ordered.

Further, in the Schoppers PhD thesis the synthesis of confinement rules uses a technique that can prevent the planner from finding any good plan, when good plans do exist. That is, the present approach can solve planning problems that could not be solved by the approach in the Schoppers thesis.

There have been many previous planning systems that automatically determined an ordering on two or more conditions so that they could all be made to hold true at the same time. However, all but two of those systems required the specification of an initial state prior to solving the planning problem, and thus are unsuitable for reactive planning situations. The present invention, along with two other planning systems, is able to determine those orderings so that they can be re-used for many different initial states.

One of the two other planners that determines goal orderings in advance of knowing the initial state is disclosed in Dawson & Siklossy, "The role of preprocessing in problem solving systems", Proceedings of the Int.Joint. Conf. on Artificial Intelligence (IJCAI), 1977. However, the planning system described there determines only those pairs of conditions that could not be made true at the same time, and for conditions that COULD be made true at the same time, it remembered a sequence of actions. The present invention generates, in advance of knowing the initial state, sets of conditions that CAN be made true at the same time, generates an order in which to make those conditions true, is not limited to ordering only pairs of conditions, and does not order actions.

The second of the two other planners that determines goal orderings in advance of knowing the initial state is disclosed in Irani & Cheng, "Subgoal ordering and goal augmentation for heuristic problem solving", Proceedings of the IJCAI, 1987, which again shows only how to order pairs of goals. That work also differs from the present invention by not allowing to attach subgoals to orderings. When the present invention orders two conditions, it may decide that before either condition can be achieved, a third should be achieved first, and the need for the third condition can be known in advance of knowing the initial state. In the Irani and Cheng paper, the need for the third condition is not determined until after knowing the initial state of the physical system to be manipulated, and then it could not be stored for later re-use.

It is a well known fact that in some situations, to achieve a particular goal, one must sometimes do and then undo certain steps. In particular, a task may have subtasks that conflict with one another. However, unless the proper ordering of actions is selected, perseveration may result. Many games contain examples of such situations. A simple example is the game in which there are three sticks and a set of N rings having graduated diameters. One starts with all the rings on one stick in diameter descending order (i.e., with the largest diameter rings at the bottom). The goal is to move one ring at a time from stick to stick until all the rings are on another stick in the same order. Furthermore, a ring with a larger diameter can never be placed on top of a ring with a smaller diameter. In order to reach the final goal it is necessary to move rings back to the original stick. While this may seem like a set back, it is in fact simply a necessary part of the process for reaching the final goal. In this simple game, it is relatively easy to develop a set of rules as to what conditions are allowed to be reversed once achieved. And yet, even in this simple game, the rule as to which conditions are reversible is "recursive": rings properly ordered but of size less than X can be moved when the current subgoal is to order all rings up to size Y, where Y is larger than X.

In general, while working on a real world problem, it is possible to have a large number of subplans, each having a rather large number of subconditions. Furthermore, it is often not simple to determine which subgoals to work on first so as to avoid conflicts between subplans.

The present invention solves the problem of determining the proper order for taking actions to accomplish subgoals. In particular, the present invention automatically generates "confinement rules" which conclusively determine the proper order for achieving multiple unmet subgoals. The process for generating confinement rules is totally automated, enabling the use of reactive planning to handle a very wide range of practical industrial, robotics and other automation applications.

SUMMARY OF THE INVENTION

In summary, the present invention is a reactive planning system that automatically generates a universal plan for achieving specified goals. The universal plan is derived from a set of primitive and deductive rules governing operation of one or more actuators, and the specified goals. The universal plan contains a tree structure defining predicates, actions and subplans for achieving the specified goals, and subgoals of those goals. Also included in the universal plan generated by the reactive planning system are a set of confinement rules which determine the proper order for achieving unmet goals. During operation of the system, after the universal plan has been formulated, a plan interpreter or executer determines the subgoals that have yet to be met, and then selects one or more subgoals as being the appropriate ones to be worked on at the current time.

More particularly, to select a goal or subgoal for processing, the plan executer first determines the set of goals that are currently achievable, which is the set of goals for which all preconditions and subgoals have been met. Then all the confinement rules in the universal plan are scanned to determine which of those rules are applicable to the goals that are currently achievable. Application of the confinement rules evaluates all interactions between subplans and determines what goals are protectable and thus can be achieved without causing a conflict between subplans.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
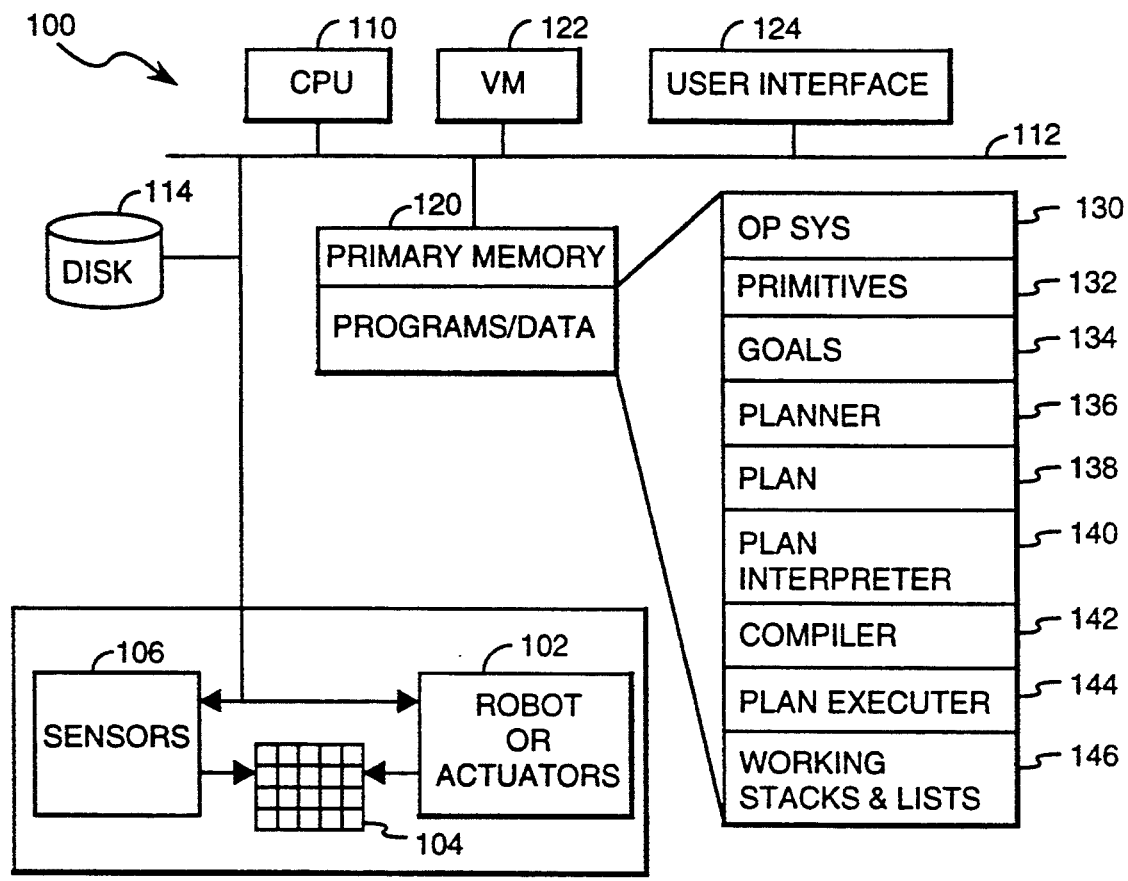
FIG. 1 is a block diagram of a computer based control system incorporating the reactive planner methodology of the present invention.

Referring to FIG. 1, there is shown a control system 100 which governs actions of a robot 102 or other set of actuators (e.g., the valves in a chemical plant) on a particular set of objects 104, herein called the physical system being operated on. The term "actuators" is herein used to mean any controllable device that performs a task, changes its environment, or otherwise performs useful work under the direction of the control system 100. The present invention is a generalized planner, and is not limited to use with robots or any other particular set of actuators. The control system 100 determines the "current situation" by means of a set of sensors 106. In each application of the invention the sensors 106 will be somewhat different. The sensors used must be able to sense, directly or indirectly, all the relevant conditions in the physical system 104.

Solely for pedagogical purposes, the preferred embodiment is described in terms of the blocks-and-baby problem posed above. Thus, the actuators 102 are a moveable arm, and a gripper at the end of the arm which can grip and release blocks. Primitive tasks that can be performed by the actuators including gripping and releasing a block, raising and lowering the arm, and moving laterally. The sensors 106 of this preferred embodiment include an open/closed sensor for the gripper, a position sensor for the gripper, and a position sensor for each of the three blocks, herein called block A, block B and block C.

The sensors 106 send sensor data to a central processing unit (CPU) 110 via a system bus 112. The same system bus 112 is used by the CPU 110 to send commands to the actuators 102. The CPU 110 is interconnected by system bus 112 to secondary memory 114 (e.g., magnetic disk storage devices), primary memory 120 (i.e., high speed, random access memory), virtual memory manager 122, and one or more user interfaces 124. Stored in primary memory 120 are operating system software 130, and the various software routines and data structures 132-146 associated with the reactive plan controller. As will be understood by those skilled in the art, other computer architectures could be used in place of the one shown in FIG. 1. For instance, in some alternate embodiments the CPU 110 would use another bus or busses, separate from the system bus 112, for communication with the sensors 106 and actuators 102.

UNIVERSAL PLAN SYNTHESIZER

The universal plan synthesizer uses as a starting point a set of primitives 132 that define a physical system 104 and a set of goals 134 to be achieved. The primitives and goals are typically computer programs prepared by a skilled programmer so as to define all the physical and logical constraints applicable to the physical system 104 and actuators 102. More generally, the "primitives" that define a system are a set of logic rules, deductive rules and constraints that define how the actions of the actuators can affect the physical system and the inter-relationships of the various components of the physical system.

The universal plan synthesizer's job is to generate a set of universal plan trees and a set of related confinement rules, as described below.

Primitives

The primitives 132 are routines and definitions that define (1) physical constraints on the physical system 104 in terms of conditions sensed by the sensors 106, (2) physical constraints on the actuators, and (3) changes in the physical system 104 which are effected by each of the primitive tasks that can be performed by the actuators 102. A set of primitives for the blocks-and-baby system are shown in Tables 1-3. The primitives in Tables 1-3 are written in a high level pseudo-code which is designed to be readable by any computer programmer of ordinary skill in the art. The particular computer language in which such primitives (and the other routines and processes described below) are implemented is not relevant to the present invention, so long as the programming language allows for recursive execution of routines.

It is believed that the physical constraint primitives listed in Tables 1 and 2 will, after review by anyone of ordinary skill in the art, be easily seen to be consistent with the above described blocks-and-baby system.

TABLE 1

PRIMITIVES DEFINING CONSTRAINTS ON PHYSICAL SYSTEM

;; The objects in the physical system
BLOCK(A) BLOCK(B) BLOCK(C)
;; Constraints on physical system (Conditions which are always TRUE)
;; Circumscribe what can be on a block/table/nothing:
ON(A,X) .or. ON(B,X) .or. ON(C,X) .or. ON(nothing,X)
CLEAR(X) ≡ ON(nothing,X)
;; The Table cannot be on anything:
ON(TABLE,nothing)
;; There's always something on the table:
~CLEAR(TABLE)
;; Blocks can be on only one thing at a time:
BLOCK(A) .and. ON(A,X) → ~ON(A,Y)
;; Blocks can have only one thing at a time on them:
BLOCK(A) .and. ON(X,A) → ~ON(Y,A)
;; Rule out a circular tower of one block:
BLOCK(A) → ~ON(A,A)
;; Rule out circular towers of two blocks:
BLOCK(A) .and. BLOCK(B) → ~( ON(A,B) .and. ON(B,A))
;; Rule out circular towers of three blocks:
CLEAR(A) .or. CLEAR(B) .or. CLEAR(C)
;; Completeness:
~CLEAR(A) .and. ~CLEAR(B) → ~ON(C,TABLE)

TABLE 2

PRIMITIVES DEFINING CONSTRAINTS ON ACTUATORS

;; Arm must be at an extreme height or in between:
AT(TOP) .or. AT(BOTTOM) .or. AT(INBETWEEN)
~AT(X) .or. -AT(Y)
;; Gripper (Hand) must be at extreme width or in between:
GRIP(CLOSED) .or. GRIP(WIDE) .or. GRIP(INBETWEEN)
~GRIP(X) .or. ~GRIP(Y)
;; Gripper can hold only one thing at a time:
HOLDING(A) .or. HOLDING(B) .or. HOLDING(C) .or HOLDING(nothing)
~HOLDING(X) .or. ~HOLDING(Y)
EMPTY ≡ HOLDING(nothing)
;; Gripper can be around only one thing at a time:
AROUND(A) .or. AROUND(B) .or. AROUND(C) .or AROUND(nothing)
~AROUND(X) .or. ~AROUND(Y)
;; Gripper can be over only one thing at a time:
OVER(A) .or. OVER(B) .or. OVER(C) .or OVER(nothing)
~OVER(X) .or. ~OVER(Y)
;; Self Consistency constraints on actuators:
AROUND(A) → ~HOLDING(A)
AROUND(A) → CLEAR(A)
HOLDING(A) → CLEAR(A)
OVER(A)    → CLEAR(A)
AROUND(A) → OVER(A)
HOLDING(A) .and.   AT(BOTTOM) → ~OVER(A)
HOLDING (A) .and. ~AT(BOTTOM) → ~OVER(A)
AROUND(A) → ~GRIP(CLOSED)
HOLDING(A) → GRIP(CLOSED)
AROUND(A) → AT(BOTTOM)
HOLDING(A) .and.   AT(BOTTOM) → ~ON(A,nothing)
HOLDING(A) .and. ~AT(BOTTOM) →  ON(A,nothing)
~HOLDING(A) → ~ON(A,nothing)
~CLEAR(A)    → ~ON A,nothing)

TABLE 2-continued

PRIMITIVES DEFINING CONSTRAINTS ON ACTUATORS

OVER(A)   →   ~ON(A,nothing)

TABLE 3

PRIMITIVES DEFINING EFFECTS OF ACTUATORS ON PHYSICAL SYSTEM

| ACTION | [PRECONDITIONS ?] SUBGOALS | RESULTS/GOALS |
|---|---|---|
| LOWERING | none | AT(BOTTOM) |
|  | CLEAR(Y) & GRIP(WIDE) & OVER(Y) | AT(BOTTOM) AROUND(Y) |
|  | CLEAR(Y) & HOLDING(X) & OVER(Y) | AT(BOTTOM) ON(X,Y) |
| RAISING | none | AT(TOP) |
|  | ON(X,Y) ? HOLDING(X) | AT(TOP) CLEAR(Y) |
| OPENING | EMPTY ? | GRIP(WIDE) |
|  | HOLDING(X) ? ON(X,Y) | GRIP(WIDE) AROUND(X) |
| CLOSING | EMPTY ? | GRIP(CLOSED) |
|  | AROUND(X) | GRIP(CLOSED) HOLDING(X) |
| LATERAL | CLEAR(X) & AT(TOP) | OVER(X) |

Referring to Table 3, the "effect description" primitives work as follows. Each line of Table 3 represents a separate primitive. Thus, for the action "LOWERING" there are three primitives. For each action, there can be one or more results (herein called goals), depending on the conditions that existed before the action was taken. Generally, actions are taken in the context of the present invention only for the purpose of achieving a goal. Thus, if the system needs to accomplish a goal, the planner software scans down the right column of Table 3 to determine which action or actions might be suitable for achieving that goal. For example, if the goal is AT(BOTTOM), the appropriate action is LOWERING the arm. More generally, within each action group (e.g., for the action "LOWERING"), the planner will use the primitive with the least complicated set of goals (the string in the Results/Goals column) that is applicable to achieving a particular goal.

The primitives 132 of the system 110 also include the software for receiving information from the sensors 106 and for performing actions using the actuators 102.

A more complicated example is a goal of GRIP(WIDE). It is not allowed to open the gripper if there is a block in the gripper, unless the block being held is on top of something (i.e., a block cannot simply be dropped in mid-air). Rules of this type are defined in terms of preconditions and subgoals. Preconditions, also called "qualifiers", are listed in the second column of Table 3 and are followed by a question mark (?), whereas items listed in the second column of Table 3 which are not followed by a question mark are herein called "subgoals".

The terms "goal" and "subgoal" shall often be used interchangeably. For example, assume that we have a goal A which has three subgoals B, C and D. When discussing the plans for achieving the subgoal B, it is often preferable to call B a goal, so that its preconditions and subgoals can simply be called "preconditions" and "subgoals", rather than sub-preconditions and sub-subgoals.

Still referring to Table 3, subgoals, if not already true, must be achieved before the action for achieving the related goal is performed. Qualifiers, on the other hand, if not already true, render the action primitive entirely inapplicable. With regard to the two OPENING primitives that can be used to achieve GRIP(WIDE), the first is applicable only when the gripper is EMPTY, and the second is applicable only when the gripper is HOLDING X (i.e., any of the three blocks). The second OPENING primitive has a subgoal: ON(X,Y). Thus, prior to executing the GRIP(WIDE) action, the subgoal of ON(X,Y) must be achieved. To make this a bit more concrete, lets assume the gripper is holding block A. The subgoal is thus ON(A,Y). Note that Y can be either of the other two blocks, or it can be the Table. To accomplish that subgoal, one looks through the third column of Table 3 to find the appropriate action primitive. In this case, the only appropriate primitive is the third LOWERING primitive.

This primitive, in turn, has three subgoals: CLEAR(Y), HOLDING(X) and OVER(Y). HOLDING(X) is known to be already true. At this point, the system has to pick a suitable Y, make sure that Y is clear (i.e., that nothing is on top of Y) and then position the arm over Y.

Universal Plans and Goals

As can be seen, even a very simple goal such as GRIP(WIDE) can have one or more subgoals, each of which may have their own subgoals. The tree of such goals, qualifiers and subgoals, and actions is herein defined to be a "plan". Plans are sometimes herein called a "universal plans", because any plan for accomplishing a specified goal is "universal" in that it provides an appropriate response for virtually all possible situations. However, as will be explained below, it should be understood that the plan tree is actually a convenient representation of the rules in the primitives which is generated by the reactive planning system. Therefore the universal plan can also be said to be the rules and goals from which the plan tree is derived.

The ultimate goals of a particular system, which may be few or numerous, are stored in an array 134. These goals define what the control system should be trying to achieve in terms of the state of the environment. Using those goals and the primitives 132, a planner routine 136 generates a set of universal plans 138 for accomplishing those goals.

Figure 2:
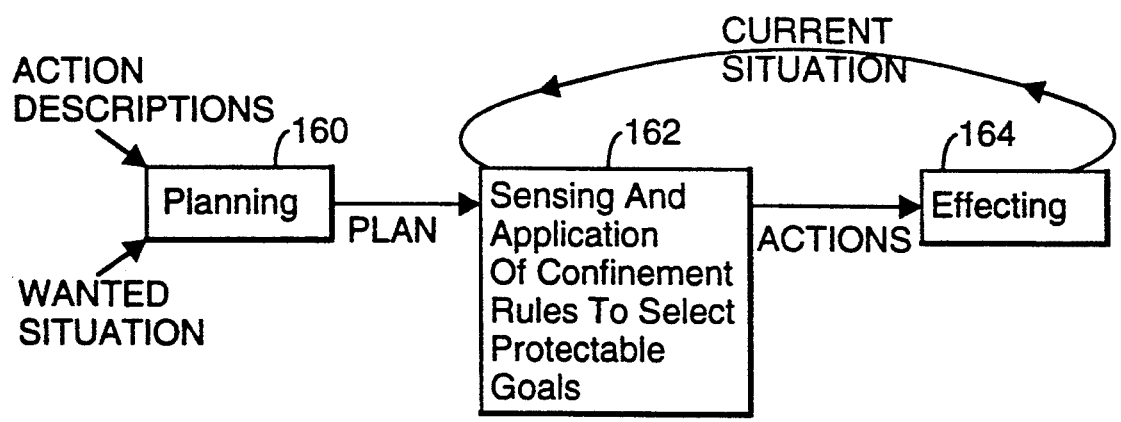
FIG. 2 is a conceptual diagram of the planning and plan execution process.

Referring to the flow chart in FIG. 2, planning (step 160) is the process of generating a set of universal plans. At Step 162 the system's sensors 106 determine the current status of the environment and then apply a set of rules herein called "confinement" rules to select what action or actions can be performed at the current time. The selected actions are ones for which there are no other actions that must be performed first. Then, at step 164, the selection action is performed and steps 162 and 164 are repeated until all the goals of the universal plan have been achieved.

Figures 3, 4:
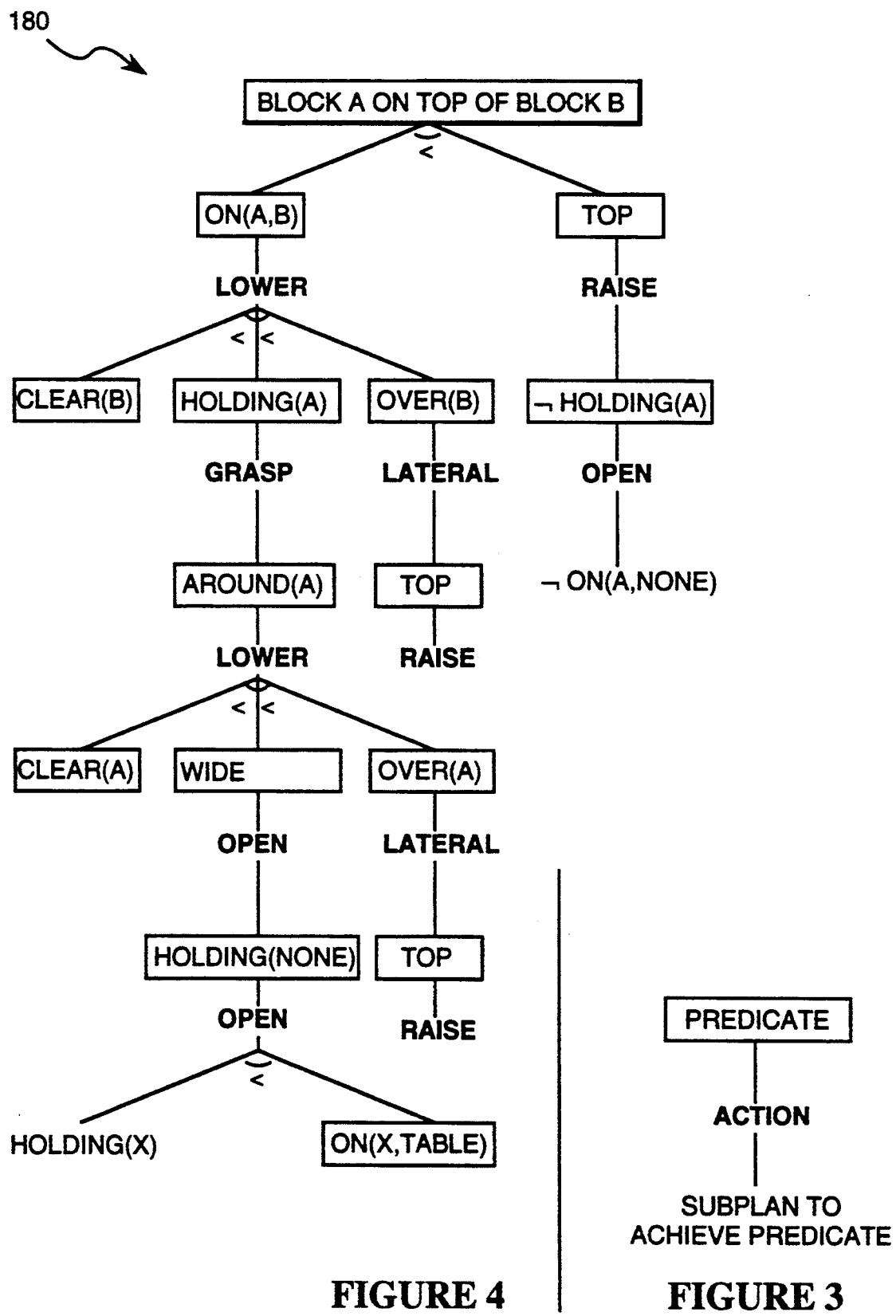
FIG. 3 shows the format used for one branch of a plan.
FIG. 4 shows a part of a "universal" plan for achieving the goal: block A on top of block B.

A universal plan has three elements: a set of goals, a set of goal trees specifying the actions required to achieve the goals, and a set of confinement rules governing the order in which subgoals are accomplished. The general form of a universal plan's goal tree (usually called a plan) is shown in FIG. 3. Each plan has a predicate, representing a goal or subgoal, a specified action to be performed by one of the system's actuators, and a subplan which has a set of one or more preconditions and/or subgoals that must be achieved before the specified action can be executed. FIG. 4 shows a part of a "universal" plan 180 for achieving the goal: block A on top of block B. Note that the symbol "∼" is used to represent the negation or "NOT" operator. Thus, a goal of "not holding block A" is written as "∼HOLDING(A)".

Figure 5:
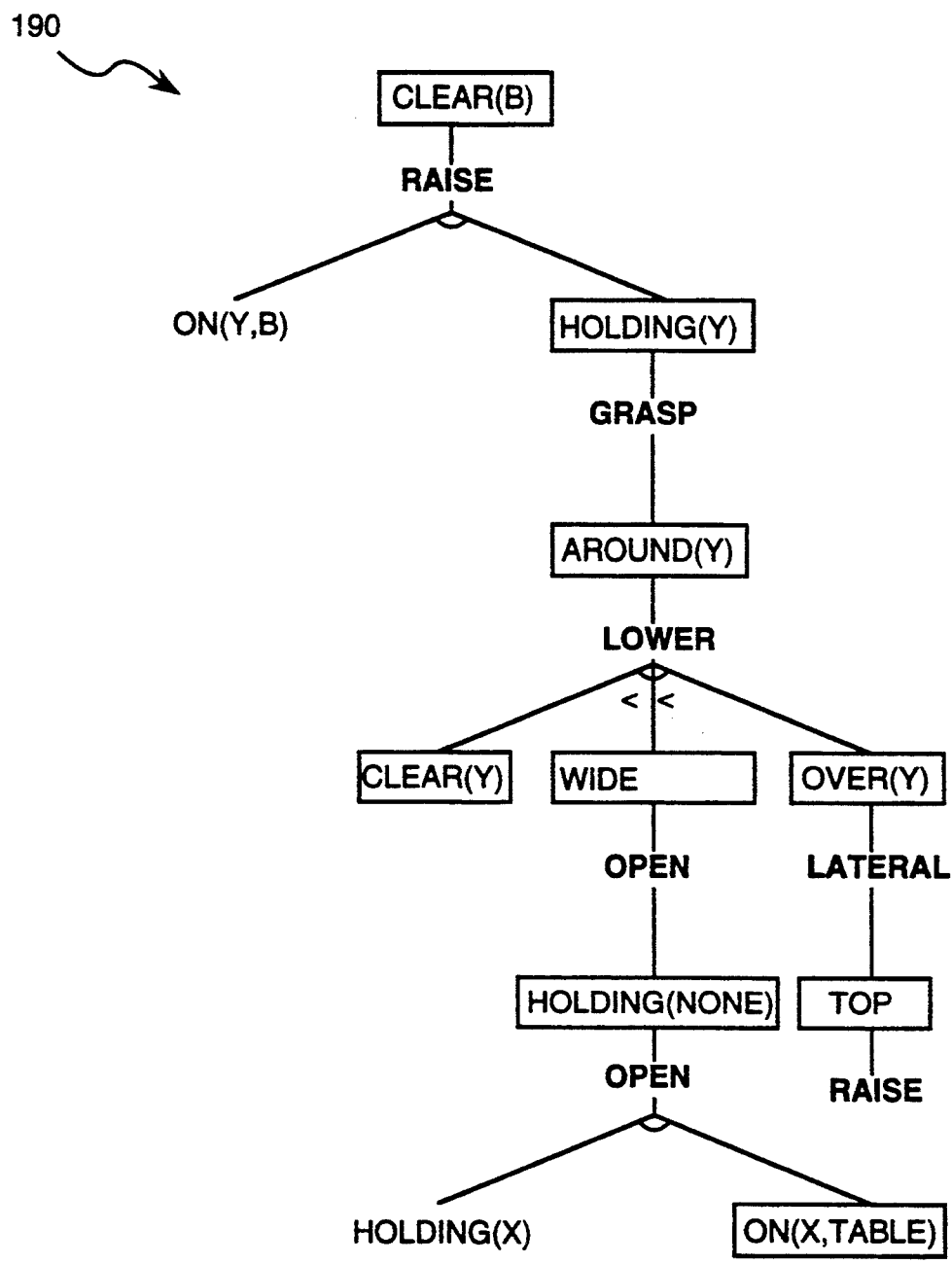
FIG. 5 shows a subplan for the subgoal "Clear (A)".

In FIG. 4 the plan for the goal "ON(A,B)" is formed first by looking at Table 3 to determine what action and subgoals are applicable to this goal. The action required is LOWER (equivalent to LOWERING in Table 3), and that action has three subgoals: CLEAR(B), HOLDING(A) and OVER(B). Each of these three subgoals has a corresponding subplan to accomplish those subgoals. FIG. 5 shows a subplan 190 for the first of these subgoals: "Clear (B)".

To illustrate how subplans are used, consider the subplan 190 in FIG. 5. Subgoals are represented by rectangular boxes, while preconditions are not enclosed in rectangular boxes. Thus "ON(Y,B)" is a precondition requiring that any other block (represented by Y) be on top of Block B. If the condition CLEAR(B) is already true, meaning that there are no other blocks on top of Block B, no actions are taken because the subgoal has already been achieved. If the precondition "ON(Y,B)" is satisfied, the subgoal of "CLEAR(B)" is HOLDING(Y), meaning that the subgoal is to grasp Block Y with a gripper (the system's primary actuator in this example). To achieve the subgoal of HOLDING(Y), the system must first accomplish the subgoal of AROUND(Y), meaning that the gripper must be positioned around object Y.

The subgoal AROUND(Y), in turn, has three subgoals: CLEAR(Y), WIDE and OVER(Y). Note that there are "<" marks between these subgoals, indicating that the subgoals are ordered to eliminate goal conflicts. In particular, for subgoals S1 and S2, "S1<S2" indicates that subgoal S1 must be achieved before subgoal S2. Subgoals may be left unordered in the universal plan, in which case the proper order for accomplishing the subgoals will be determined at the time of execution. In addition, a goal's preconditions must be satisfied before any work is performed to satisfy its subgoals because the subplan of the goal is not applicable unless all its preconditions are already satisfied.

From a brief review of the universal plans in FIGS. 4 and 5 it may seem that the sets of subconditions and subplans are infinite. However, this is actually not the case, because the plan interpreter 140 (or the plan executer 144, for plans that have been compiled by compiler 142) will always reach a point in the plan at which one or more subgoals are true. This is so because the plan is defined to cover all possible physical conditions and the set of actions needed to change the current physical conditions to meet a set of goals.

In addition, the depth of the plan tree is limited by the fact that the planner makes use of the fact that goals are predicates. A goal can exist as such only in situations in which the goal's condition is false. As the actions being analyzed occur lower and lower in the goal tree, the planner knows more and more about the circumstances in which those actions are relevant because the planner knows that all the goals higher up in the tree must be false. Eventually the planner reaches an action whose subgoals must be true because of implications that can be drawn from the fact that the action's supergoals (i.e., goals higher up in the plan tree) are all false. At that point the planner can stop adding to that branch of the plan tree because nothing below that action can ever be relevant to the plan.

Figure 6:
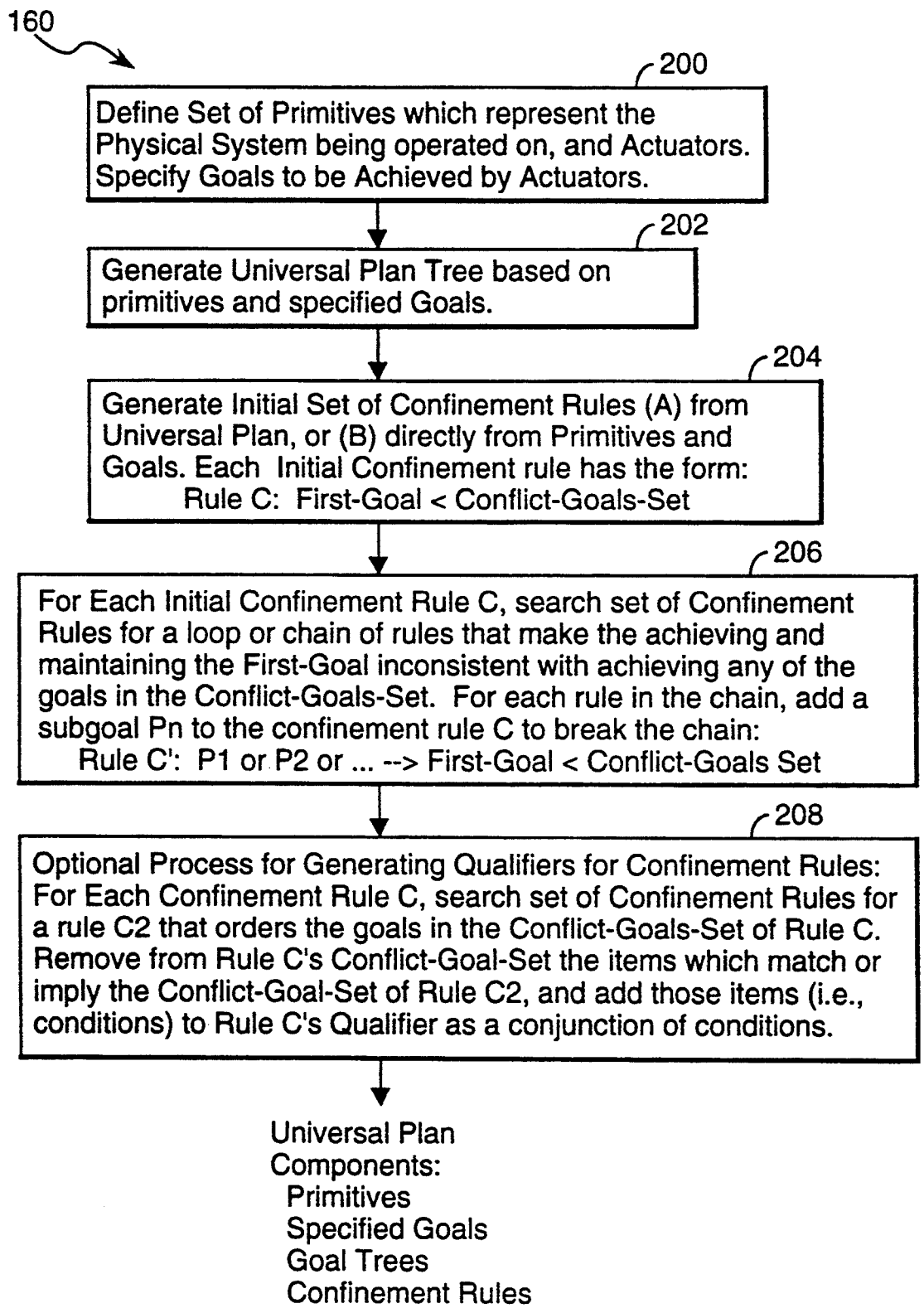
FIG. 6 is a flow chart representation of the planning process.

Referring to FIG. 6, the initial steps of the planning process 160 are to define a set of primitives that represent the physical system and actuators and a set of goals (step 200), and to synthesize a set of goal trees from the primitives that define how the goals of the system are to be achieved (step 202). The remaining steps 204, 206, 208 of the planning process 160 are for generating confinement rules.

Confinement Rules

Execution of a universal plan involves sensing the current state of the environment, selecting goals or subgoals that are ready to be accomplished, and then effecting the required actions. In the preferred embodiment, the universal plan's execution is governed by a plan interpreter 140. The plan interpreter 140 traverses the branches of the universal plan during each iteration of the execution loop shown in FIG. 2 until it selects a subgoal to accomplish. The process of selecting a subgoal is discussed in detail below. In planned future embodiments of the invention, a compiler 142 will compile the universal plan and plan execution will be handled by a plan executer 144 so as to reduce the amount of computation required to select subgoals. In either case, the plan interpreter 140 or plan executer 144 will maintain a representation of the status of the plan's execution in a set of working stacks and lists 146. More specifically, the data stored in the working stacks represents the portions of the plan not yet accomplished.

At the beginning of each execution loop, the control system 110 uses data from the sensors 106 to determine the state of the physical system being operated on, and the plan interpreter uses this information to evaluate the conditions (i.e., preconditions and subgoals) in the universal plan. More particularly, for each defined top level goal, the plan interpreter traces down through the tree of the universal plan until it reaches the "bottom" of each pathway, which is the point at which a condition or set of conditions is found to be true. At each level in the universal plan's tree, if a goal has more than one subgoal, meaning that there is a conjunction of subgoals, the plan interpreter must determine the proper order for accomplishing those subgoals. This is necessary because the subplans of the subgoals may interact and interfere with one another.

Subplan Interactions

For instance, consider the situation in which a goal has subgoals of P and Q, each of which has its own subplan. If the subgoal Q has ∼P (i.e., NOT P) as the precondition of a component action, then the plan to achieve Q must achieve ∼P at some point. If the plan for P is run before the plan for Q, the latter will undermine the work of the former. Therefore, Q should be achieved before P, and should be maintained until P has also been achieved.

This interaction would be worse if the plan for P also interfered with the plan for Q. In effect, such an interaction would require that the actions of the two plans be interleaved.

In universal plans, however, neither the planner nor the plan interpreter know which actions will be executed, let alone in what order. The actions performed and their order depends on the environment, and the environment may be unpredictable. Similarly, goals cannot be ordered, for the planner also does not know what goals will be needed at plan execution time. However, goal achievement can be constrained as follows: the plan interpreter can decide that one goal may not be attempted (at execution time) unless another goal is true. In universal plans, this is the only way that goal achievement can be constrained.

The existence of an interaction between subplans means that at execution time, one or both subplans may experience setbacks—a condition being maintained by one subplan might be reversed by the other. While universal plans are designed specifically to deal with unexpected events of this sort, interactions between universal subplans can potentially lead to perseveration: where each subplan sabotages the other plan's progress. To avoid perseveration, the goal that is achieved first among the conjoined goals (i.e., the goals in a predicate's subplan which form a conjunction of goals) must be left completely undisturbed by all the goals achieved after it.

Generating Confinement Rules

A part of every universal plan is a set of confinement rules. The process for generating confinement rules is herein described with reference to the three pseudocode routines GEN-CONF-RULES, MAY-ENFORCE, and COMPATIBLE, shown in Table 4.

For the purposes of explaining the process of generating confinement rules, we will use as an example a plan for the blocks-and-baby problem whose goals are ON(A,B) and ON(B,C). The plan tree for ON(A,B) is shown in FIG. 4, and the plan for ON(B,C) is essentially the same, except that the names of the blocks are different. This example is useful because the conflict between ON(A,B) and ON(B,C) can be understood from simple logic:

The gripper can only lift one block at a time.
If ON(A,B) is performed first and maintained, it is impossible to accomplish ON(B,C) because block B cannot be lifted while block A is on top of block B. Therefore, ON(B,C) must be accomplished before ON(A,B).
When block C is initially on top of block A, accomplishing ON(B,C) only buries block A further, so that ON(A,B) cannot be achieved if ON(B,C) is to be maintained. Therefore, block C must be lifted off block A before ON(B,C) is accomplished and maintained.

It is essential to know that the most general form of confinement rules is as follows:

qualifier?subgoals→first-goal<conflict-goals-set

The qualifier (or precondition) and subgoals are exactly analogous to the precondition and subgoals of "effect description" primitives, as described above. That is, each confinement rule is not applicable if its qualifier is not true. The first-goal of the confinement rule is a goal that must appear somewhere in the plan, and the conflict-goals-set is a set of goals that cannot all be kept true when the first-goal is being achieved. That is, at least one of the goals in the conflict-goals-set will have to be false, or be made false, when achieving the first-goal.

Note that the question mark is part of the defined syntax of confinement rule, and is simply a delimiter between the qualifier and subgoal portions of the rule. The portion of each confinement rule before the question mark is called the qualifier, the portion of each rule immediately after the question mark is called the subgoal, and the portion of each rule after the arrow represents which of the two goals should be performed first if the qualifier and subgoals are true.

Now we will consider the formal process for generating confinement rules. The process starts by calling the procedure GEN-CONF-RULES, the pseudocode for which is shown in Table 4. The first step of this procedure examines all the "effect description" primitives to find all the goals and subgoals that might ever need to be achieved. These goals are stored in a list for later use. Note that the process of collecting the goals to be used for generating confinement rules does not require use of the previously discussed universal plan trees, and that the remainder of the confinement rule generation process also does not make use of the universal plan trees. Thus, the process of determining the best order to achieve a set of goals does not require generation of a universal plan tree.

By examining the actions that may be used to achieve each goal G in the list of goals, the second step of GEN-CONF-RULES then determines the sets of conditions (stored by the procedure in a data structure called set S) which, when being maintained true, would prevent the achievement of goal G. Equivalently, the achievement of G would necessitate the un-achieving of one of more conditions in set S. In such a case, it is pointless to completely achieve the conditions in set S before achieving goal G, and GEN-CONF-RULES creates a confinement rule that instructs the plan interpreter or executor to delay achievement of at least one of the conditions in set S until after goal G has been achieved.

Next, from the set of conditions in S, GEN-CONF-RULES checks every possible condition and every possible conjunction of conditions against the plan tree to determine which conditions and conjunctions of conditions from set S would in fact, prevent the achievement of goal G. This determination is performed by calling a procedure called COMPATIBLE which determines whether a given set of conditions is compatible with achieving goal G. For each such condition or conjunction of conditions Sset that is incompatible with achieving goal G, GEN-CONF-RULES creates a simple confinement rule of the form:

true→G<Sset.

Thus, at first, GEN-CONF-RULES creates only simple confinement rules of the form true→first-goal<conflict-goals-set.

That is, the initial confinement rules generated have a qualifier that is always true, no subgoals, and a first-goal that must be achieved prior to at least one of the goals in the rule's conflict-goals-set. Subsequent steps of the procedure add subgoals and qualifiers to at least some of these initial confinement rules.

When all the subgoals and action primitives have been examined, the procedure may have created quite a few such rules. All those rules taken together define a Goal Ordering Network that is unique to, and a characteristic feature of, the approach taken by GEN-CONF-RULES. In this Network appear all the goals and subgoals that will ever need to be ordered before or after other goals or subgoals. Further, the Goal Ordering Network contains all the goal ordering decisions the plan executor will ever need.

Having obtained the Goal Ordering Network, GEN-CONF-RULES performs a second level of analysis to find out which confinement rules should have subgoals, and what those subgoals should be. This analysis works as follows.

Whenever the above confinement rule generation process adds a confinement rule that orders:

$$G < Sset$$

this means that SOME member of Sset must be achieved after G. For purposes of this explanation, suppose Sset contains a single condition S. Then it can happen that, along with the confinement rule that orders $G < S$, there may be other confinement rules that have an unfortunate consequence, namely: when G is true, G is being maintained, and S is still false, then S CANNOT be achieved! That is, a confinement rule may require a goal ordering that may be impossible to achieve in some circumstances. Fortunately, this situation can be detected, the trouble-making circumstances can be identified, and the problem can then be resolved. The detection and resolution work as follows.

Suppose that, along with the ordering $$G < S$$

we have two confinement rules that order $$\sim G2 < G$$

and $$S < G2.$$

The ordering $\sim G2 < G$ in this example means that when G is true and being maintained, and $\sim G2$ is false, then there is no way to achieve $\sim G2$. In other words, maintaining G when $\sim G2$ is false also effectively maintains G2 true. The other ordering $S < G2$ similarly means that maintaining G2 true, when S is false, also effectively maintains S false. Putting the two orderings together we see that maintaining G true, when $\sim G2$ and S are both false, effectively maintains S false. But the first rule $G < S$ says that the plan executor should achieve G and maintain it true with S false, and then should make S true! This situation is nearly a contradiction, but not quite, because maintaining G true will only keep S false if $\sim G2$ and S are BOTH false. The planner has the option of making $\sim G2$ true BEFORE achieving G or S. When that is done, the orderings $\sim G2 < G$ and $G < S$ are both satisfied, the ordering $S < G2$ is made irrelevant because G2 is false and will not be made true.

From here, the only outstanding problem is that the planner must inform the plan executor of the fact that, whenever both G and S are goals, then $\sim G2$ must be achieved before either of them. This information is conveyed to the plan executor by replacing the original confinement rule $$true \rightarrow G < S$$

with a new confinement rule $$\sim G2 \rightarrow G < S.$$

The above reasoning may be easier to understand with an example from the Blocks World. The three orderings involved might be $$ON(B,C) < ON(A,B)$$

(which orders the two goals)

$$\sim ON(C,A) < ON(B,C)$$

and $$ON(A,B) < ON(C,A)$$

which create an ordering difficulty. Intuitively, these three orderings mean (respectively) that B should be put on C before A is put on B; that when C is on A, and B is being held on C, then effectively, C is being held on A; and that, when A is not on B, and C is being held on A, it is impossible to move A onto B. The last two taken together say that if B is put on C when C is on A it becomes impossible to then put A on B. Thus the planner determines that, in order to put B on C and then put A on B, it had better make sure that when it starts, C is not on A. This discovery leads the planner to modify the confinement rule $$true \rightarrow ON(B,C) < ON(A,B)$$

to become:

$$\sim ON(C,A) \rightarrow ON(B,C) < ON(A,B).$$

Figure 7:
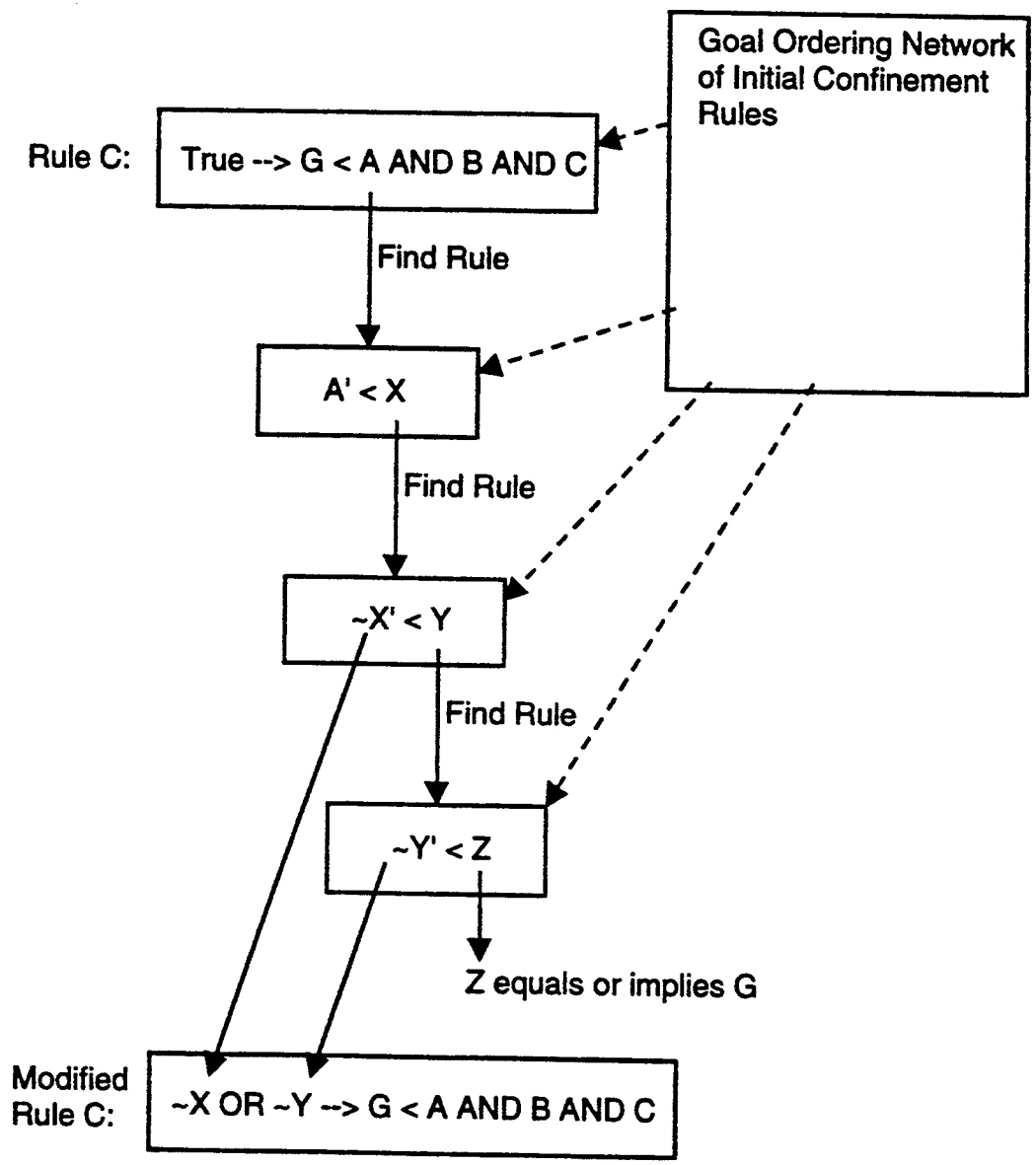
FIG. 7 is a conceptual representation of the part of the planning process concerning generation of confinement rules for avoiding conflicts between subplans.

The third step of GEN-CONF-RULES implements this process of adding subgoals to confinement rules, for the more general case in which a rule orders $G < SS$ where SS may be a set of (one or more) goals. Referring to FIG. 7, the GEN-CONF-RULES procedure inspects each previously generated confinement rule C to determine if any of the members of the rule's "goals-conflict-set" can be related back to the rule's "first goal" by a chain or loop of other confinement rules.

In FIG. 7, it should be noted that the letters A, B, C, X and Y each represent individual conditions (i.e., condition sets with just one member), that condition X' represents a condition that is either X, equivalent to X or implied by X, and that condition Y' represents a condition that is either Y, equivalent to Y or implied by Y. There is no limit on the number of rules in the chain that relates the first-goal of rule C back to a condition in the goals-conflict-set of rule C. The procedure for finding such chains or "loops" of rules in the set of confinement rules is called MAY-ENFORCE. Note that while the example in FIG. 7 shows a loop of four rules, the loop located by MAY-ENFORCE can be as short as two rules or virtually unlimited in length.

If any such loop of rules is found, then the MAY-ENFORCE procedure returns a value of TRUE and provides a list of conditions that can be used to "break" the loop. The loop of rules can be "broken," so that achieving the first-goal of rule C does not prevent achieving the goals in the goals-conflict-set of rule C, by achieving and maintaining any one of the goals (such as ~X') of the rules in the loop. Thus, the GEN-CONF-RULES procedures adds as subgoals to each confinement rule the "loop breaking" conditions generated by the MAY-ENFORCE procedure.

Boolean Function MAY-ENFORCE

This function has three arguments, namely a goal CFirst, a conflicting condition CP, and a result variable. The function examines the Goal Ordering Network to see whether the argument goal CFirst appears in such a way that when CFirst is made true and maintained, it effectively prevents achieving CP. This condition is identified by virtue of the kind of loop in the Goal Ordering Network shown in FIG. 7. If a suitable loop exists, MAY-ENFORCE returns TRUE and its result variable contains a set of conditions which would, if any one is achieved before CFirst is achieved, disable the enforced maintenance of ~CP. The need for such a disablement was described under procedure GEN-CONF-RULES above.

TABLE 4

PROCEDURES FOR GENERATING CONFINEMENT RULES

Procedure GEN-CONF-RULES (plan)

1. Inspect all the action-describing primitives provided by the user. Collect all the subgoals of all those primitives, and also collect the negations of all those subgoals. Finally, add the goals provided by the user as being the purpose of the entire plan. Subgoals that differ only by containing variables that have different names, are regarded as being the same subgoal. (Note that generation of confinement rules does not require use of the Plan's Goal Tree.)
2. For each goal or subgoal G in the resulting list:
  {
        -- Collect the set of conditions that, when being
        -- maintained true, might prevent the achievement of G.
        Make S be the empty set.
        For each action A that can achieve G:
        {
              For each condition E (other than G itself that is unavoidably
              achieved by A whenever A achieves G, add 'not E' to the
              set S.
              For each qualifier P that must be true if A is to achieve G,
              add "not P" to the set S.
              For each subgoal SG that must be true if A is to achieve
              G, add "not SG" to the set S.
        }
        Remove from S all conditions that are equivalent to or implied by G.
        -- Now find sets of conditions that, when being
        -- maintained true, will in fact prevent the
        -- achievement of G. Note that this might take one,
        -- two, or even more conditions.
        Let N be the lesser of: the number of actions that can achieve G,
        and: the number of conditions in S.
        Let PowerSet be the set of consistent subsets of S.
        For I from 1 to N:
        {
              For every element Sset of PowerSet, such that Sset
              contains I elements (i.e., Sset is a subset of S):
              {
              Call COMPATIBLE(G, Sset). If the result is FALSE:
                    {
                          -- Some condition in Sset must be
                          -- achieved AFTER G.
                          Add to the plan a new confinement rule
                          "true —> G < Sset".
                          Remove from PowerSet all those elements
                          that are supersets of Sset.
                    }
              }
        }
  }
3. Generate Subgoals and Qualifiers for Confinement Rules.
    -- At this point we have constructed the Goal Ordering Network.
    -- Now figure out which confinement rules need subgoals.
    For each previously generated confinement rule
        C = "true —> CFirst < Sset1"
    {
        Split Sset1 into two subsets SsetT and SsetF, as follows: for each
        condition CP in Sset1, if MAY-ENFORCE(CFirst, CP, CSubgoals)
        returns TRUE and CSubgoals is not empty, then put CP into SsetT,
        otherwise put CP into SsetF.
        -- SsetF is the set of conditions that are in no
        -- danger of being prevented by CFirst. SsetT is
        -- the set of conditions that may be prevented, and
        -- that can be achieved after CFirst only if the
        -- confinement rule gets an appropriate subgoal.
        When a call to MAY-ENFORCE returns TRUE but CSubgoals
        remains empty, then CFirst and CP are incompatible goals: no

TABLE 4-continued
PROCEDURES FOR GENERATING CONFINEMENT RULES matter which one has been achieved first, the second cannot be
achieved without undoing the first. Delete the confinement rule
C, replace ft with
    false —> CFirst < CP,
and go to the top of this loop, restarting with the next confinement
rule C, otherwise continue here.
If SsetT is not empty, delete the original confinement rule C -- we're
going to replace it.
For each condition CP in SsetT:
{
    Call MAY-ENFORCE(CFirst, CP, CSubgoals) to find
    CSubgoals, the set of conditions whose truth will allow CP
    to be achieved even after CFirst is being maintained.
    Let SsetFcopy be a fresh copy of SsetF.
    Add CP to SsetFcopy.
    Format CSubgoals as a disjunction (OR), and make the
    result be the subgoal of confinement rule C, as follows: if
    CSubgoals is the set of conditions {P1,P2, . . . }, then create
    the following confinement rule and add it to the plan:
    P1 or P2 or . . . —> CFirst < SsetFcopy.
    -- (in practice it rarely happens that confinement
    -- rules need such disjunctive subgoals.)
}
-- We can now simplify some of the confinement
-- rules (this is optional processing).
For each confinement rule
    C = "Subgoal —> CFirst < Sset1"
{
    Let Q be an empty set.
    Search the existing set of confinement rules for a different
    confinement rule C2 that orders
        G2 < Sset2
    where G2 is in Sset1, and where Sset2 is equivalent to or
    implied by Sset1 (i.e., Sset1 is larger than Sset2).
    For each such confinement rule C2, do this: remove from
    Sset1 the conditions that together imply Sset2, and add to
    Q those same conditions but with a "#" prefixing each.
    -- Rule C2 applies whenever Rule C does, and limits
    -- protectability more strongly than Rule C, so Rule C is
    -- redundant with respect to all the conditions in Sset2.
    -- The notation "#P" means that P must be a goal in the
    -- Truncated Plan Tree, P must be true, and P must be
    -- protectable (see plan execution).
    If Q is not empty, then delete C, and replace it with the new
    confinement rule
        Q ? Subgoal —> CFirst < Sset1
    (where Sset1 no longer contains the conditions removed
    from it).
}
}
Boolean Function MAY-ENFORCE(CFirst, CP. CSubgoals)
1. Let CSubgoals be the empty set.
2. Find a confinement rule that orders P2 < X, where CP is equivalent to
   or implies P2, and X is a condition-set with only one member. If there
   is no such confinement rule, then return FALSE and exit, otherwise
   continue.
   -- This makes X enforce ~P2 which implies ~CP.
3. If X is either equivalent to or implied by CFirst, then go to step 7, otherwise
   continue with step 4.
   -- If CFirst implies X, it also enforces ~CP. In that case CP and CFirst
   -- are incompatible and MAY-ENFORCE exits.
4. Find a confinement rule that orders ~X' < Y, where X' is equivalent to
   or implies X, and Y is a condition-set with only one member. If there is
   no such confinement rule, then return FALSE and exit, otherwise continue.
   -- This makes Y enforce X', which implies X, which enforces ~CP.
5. Add ~X' to CSubgoals.
   -- If X' were false, Y would not enforce ~CP.
6. If Y is either equivalent to or implied by CFirst, then go to step 7, otherwise
   let X = Y and go to step 4.
   -- If Cfirst implies Y, it also enforces ~CP.
7. Return TRUE and pass back the contents of CSubgoals.
Boolean Function COMPATIBLE(Agoal, conflict-goals-set)

If there is ANY action that (a) can make Agoal true, AND (b) can do so
    while all the conditions of conflict-goals-set are true, AND (c) can do so
    without making any of the conditions of conflict-goals-set false, then return
    TRUE, otherwise return FALSE.

The GEN-CONF-RULES procedures also includes a last, optional step for simplifying the previously generated confinement rules. In particular, if the elements of a conflict-goals-set Sset1 of a first confinement rule C are ordered by a second confinement rule C2 having a more restrictive conflict-goals-set Sset2, then rule C2 applies whenever rule C applies, and rule C2 is the stronger rule with regard to the protectability of previously achieved goals. As a result, rule C is modified by removing the elements of its conflict-goals-set Sset1 which together imply Sset2, and those elements are placed in the qualifier of rule C. Thus, rule C will be applicable when its qualifier elements are true and protectable.

Boolean Function COMPATIBLE

This function has two arguments, namely a set of conditions to be kept true, and a goal to be achieved. The function returns TRUE if and only if there is an action that can in fact achieve the goal while all of the conditions are, and remain, true.

To review what has been covered so far, the automated plan synthesizer requires a set of basic deductive rules and primitive action definitions. These incorporate assumptions as to what can be sensed, what actions can be taken, etc. In addition, the plan synthesizer needs a set of goals for the system, defining what the plan executer should be trying to achieve in terms of the state of the environment. Then the plan synthesizer analyzes the subgoals and preconditions of the action primitives to generate a set of related confinement rules, as described above with reference to Table 4. In the preferred embodiment, the universal plan trees and the related confinement rules together comprise a universal plan.

Alternately, since the plan tree is actually a representation of the specified goals and the rules in the primitives, the universal plan can be considered to be the specified goals, the rules in the primitives and the confinement rules. In complicated control systems, a complete plan tree might require excessive amounts of memory, in which case the portions of the plan tree needed at any point in time could be regenerated (from the specified goals and the primitives) on the fly by the plan interpreter or plan executer.

PLAN INTERPRETATION/EXECUTION

The following explanation is applicable regardless of whether a universal plan is executed by a Plan Interpreter (i.e., dynamically evaluated at the time of execution), or is compiled and executed by a Plan Executer.

The basic scheme for executing a universal plan is to identify goals (which includes subgoals) of the plan that are presently achievable, because their preconditions and subgoals are true, and then to select from among those achievable goals one or more goals to accomplish at the present time. Conceptually, it is best to select goals that can be maintained. Alternately stated, it is best to avoid selecting goals that are not useful because they are inconsistent with other goals of the system and will therefore have to be reversed during the course of achieving those other goals.

The confinement rules in the universal plan indicate the order in which goals should be achieved for the sake of avoiding conflicts between subplans.

In the present invention, the plan interpreter/executer incorporates the above discussed conflict avoidance requirements as follows. While processing any concurrent set of atomic goals, the plan interpreter determines which of those goals are "protectable"—i.e., which actions can be performed for which there are no other actions that must be performed first. Protectability of a goal is determined by evaluating the confinement rules applicable to that goal.

Figure 8:
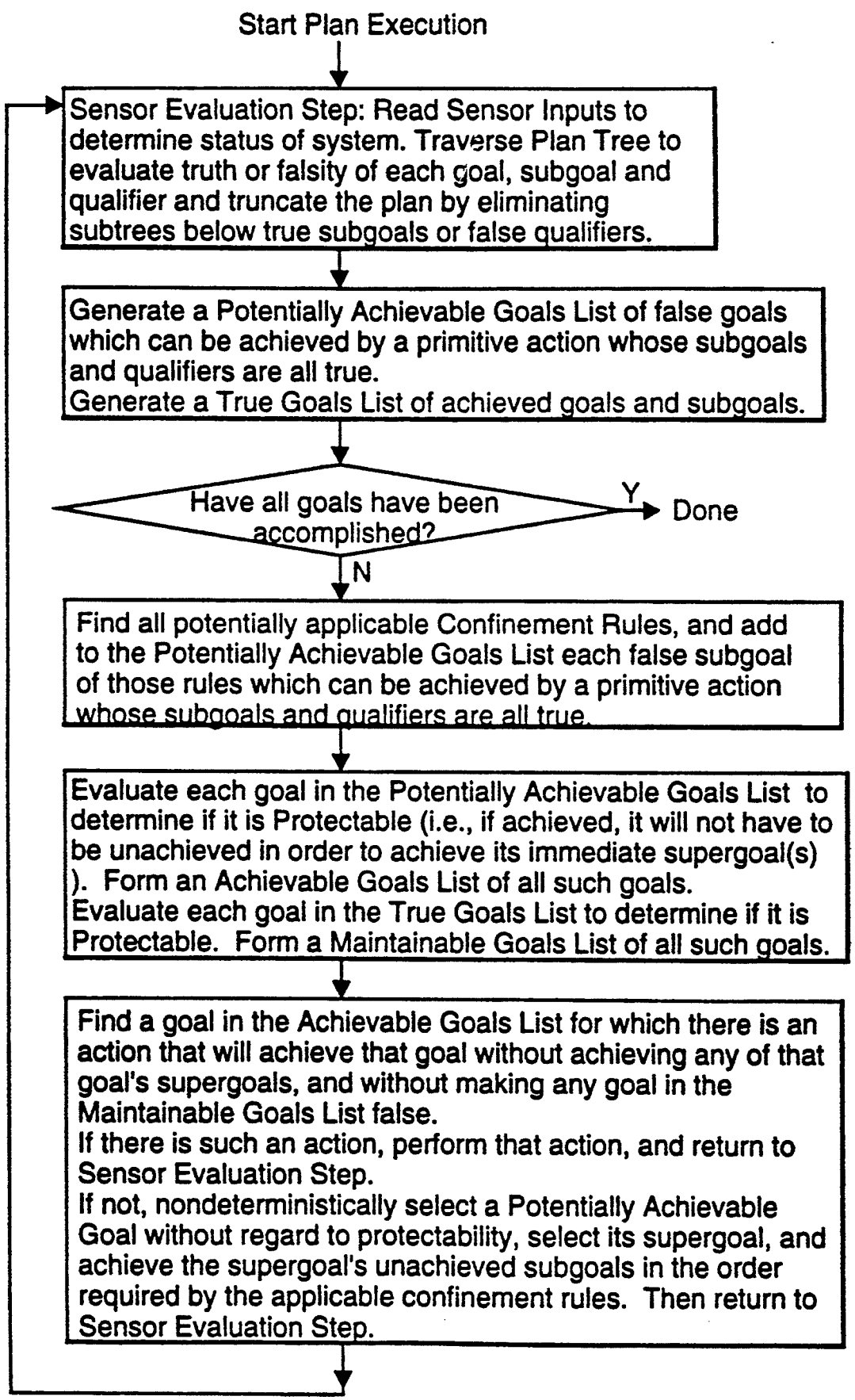
FIG. 8 is a flow chart representation of the plan execution process.

The process for selecting actions to be performed is herein described with reference the plan execution flow chart in FIG. 8 and with respect to the two pseudocode routines ALREADY and PROTECTABLE shown in Table 5.

Steps 1,2 and 3 of the ALREADY procedure determine which goals and subgoals of the universal plan have already been achieved, as well as which subplan preconditions are true, and based on that determination, it generates a list of goals and subgoals that could potentially be achieved next. That list is called the Potentially Achievable Goal List. For simplicity, we will use the term "goals" to mean both goals and subgoals of a specified universal plan. A potentially achievable goal is any goal whose subgoals have been achieved and whose preconditions are true. At any point during the execution of a plan, there may be many goals which are potentially achievable.

Step 4 of the ALREADY procedure deals with the possibility that the next goal that needs to be achieved in the system is not in the Potentially Achievable Goal List generated by steps 1-3, but instead is one of the subgoals of the confinement rules applicable to the goals in the Goal List. As explained below, the determination of whether a specified goal is not protectable is based on the confinement rules applicable to that specified goal. Furthermore, a specified goal is not protectable if any of the subgoals of the confinement rules applicable to that goal are not true. Therefore, it is often necessary to first achieve the subgoals of one or more confinement rules before achieving goals in the plan tree.

Thus Step 4 of the ALREADY procedure finds all confinement rules applicable to the Truncated Plan Tree. For each such confinement rule, if the rule's subgoal is not yet true, a second truncated plan tree is generated and the unachieved subgoals in that truncated plan tree are added to the Goal List. The subgoals of this second truncated plan tree which are ready to be achieved (because their sub-subgoals and preconditions am true) am added to the Potentially Achievable Goal List. Step 4 is repeated until no more goals are added to the Goal List.

Step 5 of the ALREADY routine calls the PROTECTABLE function to evaluate the protectability of each goal in the Potentially Achievable Goal List. A specified goal is said to be protectable if it can be achieved and made use of, without having to be unachieved in between. In effect, this means that the action required to achieve the specified goal will not conflict with other parts of the universal plan. The PROTECTABLE function is discussed below.

Then, the actions required to achieve one or more of the protectable goals in the Potentially Achievable Goal List are performed at Step 6 of the ALREADY routine. If several goals in the list are protectable, all the corresponding actions can be taken without having to reevaluate the conditions in the plan tree because it is guaranteed that the subplans for the protectable goals do not conflict. However, if these actions cannot be performed in parallel or in a short period of time, it may be necessary to reevaluate the conditions in the plan tree because intervening forces not under the control of the plan executer (e.g., the baby in the blocks-and-baby problem) may change the plan tree's conditions if a sufficient amount of time is allowed to elapse.

After performing one or more of the protectable actions in step 6, the ALREADY procedure returns to Step 1, where it reevaluates the conditions in the plan tree and so forth.

Step 7 of the ALREADY procedure is performed only when no protectable goals are found in Step 6. Step 7 attempts to break out of the logjam of conflicting subgoals by nondeterministically selecting a supergoal of a potentially achievable goal, and choosing a different plan to achieve that goal. If even that does not work, a message is sent to the system operator indicating that the plan interpreter may be stuck due to an unresolvable conflict between subplans.

The PROTECTABLE Function

In the context of the present invention, "protectability" means that a goal or condition can be maintained while various other goals are achieved. However, a protectable goal is not necessarily maintained indefinitely. Protectability of a specified goal is evaluated only with respect to the other goals found in the confinement rules applicable to the specified goal at the time the plan is being executed. Thus, the protectability of any goal is dynamically re-evaluated as conditions in the system change. As the system gets closer to accomplishing all of its goals, the number of goals which are true and protectable will generally increase, but during the early stages of executing a complex plan it is very possible for protectable goals that are accomplished at one point in the plan execution to be undone at various stages of the plan execution in order to accomplish goals higher in the plan tree. The undoing of previously protectable goals is not a sign of backward progress, but is rather an indication that some subplans and subgoals become irrelevant once they have been accomplished, because they are just temporary building blocks needed for achieving goals higher in the plan tree.

The mechanics of the PROTECTABLE function are that it inspects all confinement rules to determine if any applicable rule indicates that a specified goal G would have to be unachieved while achieving another goal that shares a supergoal with goal G in the plan tree that. If so, then goal G is not protectable. If no such confinement rule exists, goal G is protectable.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, the CPU 110 in FIG. 1 could be replaced by a set of parallel processors. In particular, it would be advantageous to use multiple processors to evaluate in parallel the protectability of all the potentially achievable goals. The work to be performed by each of the multiple processors could be assigned in a number of different ways. For instance, a plan might be compiled out as a "neural network", with each goal, subgoal, precondition, and action of the plan being implemented as a node in the neural network, so that the truth and protectability of all goals and subgoals could be determined in parallel. Alternatively, a plan interpreter might dynamically construct some part of such a neural network, and might then allow that part to run in parallel. Again, a plan interpreter might use the primitives and confinement rules of a plan to generate a decision tree or decision table that might then be executed by a real-time computer. Or as yet another alternative, if the system has several specified "top level" goals, each processor could be assigned to evaluate the goals and subgoals in the plan tree associated with one of the specified goals. All the processors would share sensor data regarding the current status of the system. In addition, the task of controlling the system's actuators 102 could either be handled by one processor or each of several processors could be assigned the task of controlling one or more of the system actuators.

TABLE 5

PLAN EXECUTION PROCEDURES

Procedure ALREADY(plan)

1. Generate a Truncated Plan Tree, by reading sensor inputs to determine status of the physical system 104, and then (A) traversing the entire Plan Tree, evaluating the current Truth or Falsity of every goal, subgoal and qualifier, and (B) truncating the Plan Tree by eliminating all subtrees below TRUE subgoals or FALSE qualifiers, and (C) revising the Plan Tree whenever the achievement of a subgoal would imply the achievement of any supergoal of that subgoal by replacing that subgoal and its action with an alternate subtree for achieving that supergoal. If, for a given goal, there are two or more plans that can achieve the given goal, then choose a plan which consists of a single primitive action whose subgoals and qualifiers are all true, if such a plan exists; otherwise nondeterministically choose a plan.
   -- The check that an action should not achieve any
   -- supergoals takes care of the situation in which
   -- goal P has subgoal P: if we did not make this check,
   -- we could get a never-ending series of P subgoals.
2. Make a True-Goals-List comprising every TRUE goal and subgoal (collectively called goals) of the Truncated Plan Tree.
3. Make a Potentially-Achievable-Goals-List comprising all FALSE goals and subgoals of the Truncated Plan Tree that can be achieved by a primitive action whose subgoals and qualifiers are all true.
4. Find all confinement rules whose qualifiers are true, and whose first-goal is in the Truncated Plan Tree, and whose conflict-goals-set is such that every goal in the conflict-goals-set is either equivalent to or implied by some goal in the Truncated Plan Tree. For every such confinement rule: (A) add all its subgoals to the Truncated Plan Tree, and (B) add all its TRUE subgoals to the True-Goals-List, and (C) add, to the Potentially-Achievable-Goals-List, such of the confinement rule's FALSE subgoals as can be achieved by a primitive action whose subgoals and qualifiers are all true.
   Repeat step 4 until no more goals are added to the Truncated Plan Tree.

TABLE 5-continued
PLAN EXECUTION PROCEDURES

5. Make an empty Achievable-Goals list, and an empty Maintainable-Goals-List.
   Evaluate each goavsubgoal in the True-Goals-List by calling PROTECTABLE(goal). Whenever the PROTECTABLE function returns a value of True for a given goal, add that goal to the Maintainable-Goals-List.
   Evaluate each goal/subgoal in the Potentially-Achievable-Goals-List by calling PROTECTABLE(goal). Whenever the PROTECTABLE function returns a value of True for a given goal, add that goal to the Achievable-Goals-List.
6. -- For systems in which actions are performed serially --
   Find a goal in the Achievable-Goals-List for which there is an action that will achieve that goal without achieving any of that goal's supergoals, and without making any goal in the Maintainable-Goals-List false. If there is such an action, perform that action, otherwise do step 7.
   Restart at Step 1.
7. Nondeterministically select a goal that is in the Potentially-Achievable-Goals-List and that can be achieved by two or more plans, where at least one plan has not been chosen previously. If there is such a goal, then choose a previously unchosen plan to achieve that goal, and return to step 3. If there are no such goals, then nondeterministically select a supergoal of one goal in the Potentially-Achievable-Goals-List, and send an error message to the system operator ("Reached point with no protectable goals; attempting to move forward by achieving unprotected goal:" selected supergoal) and achieve the unachieved subgoals of that supergoal in order required by the applicable confinement rules (without regard to protectability).

Step 6 of the ALREADY Procedure for systems in which multiple actions can be performed in parallel by different actuators:

6. Find ALL goals in the Achievable-Goals-List for which there is an action that will achieve that goal without achieving any of that goal's supergoals, and without making any goal in the Maintainable-Goals-List false. If there are one or more such actions, choose a subset of those actions that can be performed in parallel, and perform that subset in parallel; if there are no such actions, do step 7.
   Restart at Step 1.

Boolean Function PROTECTABLE(G)

-- This function returns FALSE if and only if some
-- confinement rule C shows that the argument goal G
-- should not be achieved yet (because it will have to
-- be un-achieved before ft can be used).
-- For the purposes of this function, the components of
-- each confinement rule are as follows:
   qualifier ? subgoal → first-goal < conflict-goals-set
-- Note that the subgoal may contain one or more goals (which may be,
-- organized as a disjunction or as a disjunction of one or more conjunctions)
-- and that the qualifier may be a conjunction of two or more conditions.

If there is ANY confinement rule C for which: criteria (a) through (f) below are all true, OR criteria (a) through (e) and (g) are true, OR criteria (a) through (c) and (g) through (h) are all true, then return FALSE (goal G is not PROTECTABLE), otherwise return TRUE (goal G is PROTECTABLE).

(a) C's first-goal is a goal in the Truncated Plan Tree.
    -- so C applies.
(b) all the members of C's conflict-goals-set occur in or are implied by goals in the Truncated Plan Tree, excluding subgoals and supergoals of C's first-goal.
    -- so C applies.
(c) either C has no qualifier, or C's qualifier is true.
    -- so C applies.
(d) the truth of G implies the truth of some member M of C's conflict-goals-set.
    -- so when G is true, M must also be true.
(e) except for M, all the members of C's conflict-goals-set (if any) are PROTECTABLE and either equivalent to, or implied by, goals in the True-Goals-List.
    -- so when G is true, the conflict-goals-set will all
    -- be true and G will be the only member of C's
    -- conflict-goals-set that is not PROTECTABLE
(f) C's first-goal is not both TRUE and PROTECTABLE.
    -- so C's first-goal has yet to be achieved, and when
    -- it is, some member of conflict-goals-set will be
    -- unachieved, and since G is the only unprotectable
    -- member, G will be unachieved, so we shouldn't bother
    -- to achieve G just yet, and should achieve C's
    -- first-goal instead.
(g) C has a subgoal that is not both TRUE and PROTECTABLE.
    -- so the subgoal must be achieved and protected before
    -- the first-goal, and that may well un-achieve the
    -- first-goal.
(h) The truth of G implies the truth of rule C's first-goal.

TABLE 5-continued

PLAN EXECUTION PROCEDURES

-- so C's unprotectable subgoals must be made protectable before G.

What is claimed is:

1. A reactive planning and plan execution method for accomplishing a specified set of goals with a predefined set of actuators in a physical system, the steps of the method comprising:

storing a specified set of primitives that define said physical system, primitive actions that can be performed by said actuators, and changes in the defined physical system effected by said primitive actions; said set of primitives including primitives that specify goals and subgoals with respect to each primitive action that can be performed by said actuators;

generating and storing in said computer memory, based on said stored set of primitives and without regard to said specified set of goals, a set of confinement rules for ordering achievement of combinations of said goals and subgoals, each confinement rule containing both a single first goal (the rule's First-Goal) to be achieved and a set of goals (the rule's Conflict-Goals-Set), such that at least one goal in said Conflict-Goals-Set cannot be kept true when said First-Goal is being achieved; wherein a first plurality of said confinement rules have at least two goals in their respective Conflict-Goals-Sets and constrain order of achievement of at least three goals without constraining order of achievement of any pair of said at least three goals;

generating and storing in a computer memory, based on said set of primitives and said predefined set of goals, a universal plan tree comprising a hierarchy of plans for accomplishing defined goals, said defined goals including said specified set of goals and subgoals thereof, wherein each plan in said hierarchy of plans specifies an action for accomplishing one of said defined goals, preconditions for taking said specified action and a set of subgoals that must be met before performing said specified action;

selecting and performing actions specified in said universal plan tree, said actions being performed using said predefined set of actuators in sequences consistent with said confinement rules, and repeating said selecting and performing steps until said specified set of goals is achieved.

2. The reactive planning and plan execution method of claim 1, wherein said selecting and performing steps include repeatedly performing the steps of: determining which goals in said universal plan tree are currently achievable, applying said confinement rules to select from the currently achievable goals those which should be achieved first, and then performing the actions specified in said universal plan tree for accomplishing the selected goals.

3. The reactive planning and plan execution method of claim 1, wherein said performing actions step includes:

(A) evaluating the preconditions and defined goals in said universal plan tree so as to determine which of said defined goals in said universal plan tree are currently achievable goals;

(B) selecting one or more goals from among said currently achievable goals by determining which of said confinement rules are applicable thereto and selecting at least one currently achievable goal for which there is no confinement rule requiring another defined goal to be accomplished prior to achieving said selected goal;

(C) performing the action specified in said universal plan tree to accomplish said selected one or more goals;

(D) repeating steps A-C until all of said specified goals have been achieved.

4. The method of claim 3, wherein a second plurality of said confinement rules include a qualifier such that said confinement rule is applicable only when said qualifier represents a condition that is true, and all other confinement rules include an implied qualifier that is always true; and a third plurality of said confinement rules include subgoals that must be accomplished prior to achievement of said First-Goal and prior to achievement of the goals in said Conflict-Goals-Set;

said step of selecting one or more goals includes determining whether each currently achievable goal P is protectable, and selecting protectable ones of said currently achievable goals, if any, wherein a goal P is defined to be protectable when there is no confinement rule C in said set of confinement rules such that of the following criteria, (a) through (e) below are all true and one or both of criteria (f) and (g) are true:

(a) rule C's first-goal has not yet been achieved or is a subgoal of a goal that has not yet been achieved;

(b) all the members of rule C's conflict-goals-set have not yet been achieved or are subgoals of a goal that has not yet been achieved;

(c) rule C's qualifier is true;

(d) the truth of P implies the truth of some member M of C's conflict-goals-set;

(e) except for M, all other members of rule C's conflict-goals-set, if any, are equivalent to, or are implied by, true and protectable subgoals in said plan tree;

(f) rule C's first-goal is not both true and protectable; and (g) rule C has a subgoal that is not both true and protectable; and when no said confinement rule in said set of confinement rules meets said criteria with respect to goal P, goal P is denoted as being achievable and protectable.

5. The reactive planning and plan execution method of claim 1, wherein said step of generating and storing confinement rules includes determining from said primitives whether each said goal for which confinement rules are being generated can be achieved when each potentially conflicting goal and each potential combination of potentially conflicting goals have been previously achieved, and generating said confinement rules with each rule's Conflict-Goals-Set equal to one of (A) a conflicting goal whose prior achievement and maintenance would prevent achievement of said each goal, and (B) a combination of conflicting goals whose prior achievement and maintenance would prevent achievement of said each goal.

6. The reactive planning and plan execution method of claim 5, wherein said step of generating confinement rules includes automatically generating subgoals for ones of said confinement rules by searching, with respect to each one confinement rule, for a chain of other confinement rules in said set of confinement rules which specify that achievement and maintenance of said one confinement rule's First-Goal could prevent achievement of any goal in said one confinement rule's Conflict-Goal-Set, and then adding a subgoal to said one confinement rule for each condition that would break said chain of other confinement rules so as to enable achievement of said goal in said one confinement rule's Conflict-Goal-Set.

7. The reactive planning and plan execution method of claim 1, wherein said step of generating and storing confinement rules includes comparing confinement pairs of confinement rules having overlapping Conflict-Goal-Sets, and adding a qualifier to the one of said pair of confinement rules having the larger Conflict-Goal-Set to limit said one confinement rule's applicability, wherein said added qualifier represents shared goals in said overlapping Conflict-Goal-Sets and such that said one confinement rule is applicable only when said added qualifier represents a condition that is true.

8. The reactive planning and plan execution method of claim 1, wherein a second plurality of said confinement rules each include a qualifier such that said each confinement rule is applicable only when said qualifier represents a condition that is true, and all other confinement rules include an implied qualifier that is always true.

9. The reactive planning and plan execution method of claim 1, wherein a second plurality of said confinement rules each include a qualifier such that said each confinement rule is applicable only when said qualifier represents a condition that is true and include subgoals that must be accomplished prior to achievement of said First-Goal and prior to achievement of the goals in said Conflict-Goals-Set.

10. A reactive planning and plan execution method for accomplishing a specified set of goals with a predefined set of actuators in a physical system, the steps of the method comprising:
   storing a specified set of primitives that define said physical system, primitive actions that can be performed by said actuators, and changes in the defined physical system effected by said primitive actions; said set of primitives including primitives that specify goals and subgoals with respect to each primitive action that can be performed by said actuators;
   generating and storing in said computer memory, based on said stored set of primitives, a set of confinement rules for ordering said specified set of goals and all goals and subgoals of said primitive actions, each confinement rule containing both a single first goal (the rule's First-Goal) to be achieved and a set of goals (the rule's Conflict-Goals-Set), such that at least one goal in said Conflict-Goals-Set cannot all be kept true when said First-Goal is being achieved; wherein a first plurality of said confinement rules have at least two goals in their respective Conflict-Goals-Sets and constrain order of achievement of at least three goals without constraining order of achievement of any pair of said at least three goals; and wherein a second plurality of said confinement rules each include (A) a qualifier such that said each confinement rule is applicable only when said qualifier represents a condition that is true and (B) subgoals that must be accomplished prior to achievement of said First-Goal and prior to achievement of the goals in said Conflict-Goals-Set;
   selecting and performing actions to achieve said specified set of goals and subgoals thereof, said actions being performed using said predefined set of actuators in sequences consistent with said confinement rules, and repeating said selecting and performing steps until said specified set of goals is achieved.

11. The reactive planning and plan execution method of claim 10, wherein said selecting and performing steps include repeatedly performing the steps of: determining which of said specified set of goals and subgoals thereof am currently achievable, applying said confinement rules to select from the currently achievable goals those which should be achieved first, and then performing the actions specified by said primitive for accomplishing the selected goals.

12. The reactive planning and plan execution method of claim 10, wherein said performing actions step includes:
   (A) evaluating the specified set of goals and subgoals of the primitive actions related thereto so as to determine which of said goals and subgoals are currently achievable goals;
   (B) selecting one or more goals from among said currently achievable goals by determining which of said confinement rules are applicable thereto and selecting at least one currently achievable goal for which there is no confinement rule requiring another defined goal to be accomplished prior to achieving said selected goal;
   (C) performing the action specified by said primitives to accomplish said selected one or more goals;
   (D) repeating steps A–C until all of said specified goals have been achieved.

13. The method of claim 12, wherein
   any confinement rules in said set of confinement rules that do not include said qualifier include an implied qualifier that is always true;
   said step of selecting one or more goals includes determining whether each currently achievable goal P is protectable, and selecting protectable ones of said currently achievable goals, if any, wherein a goal P is defined to be protectable when there is no confinement rule C in said set of confinement rules such that of the following criteria, (a) through (e) below are all true and one or both of criteria (f) and (g) are true:
   (a) rule C's first-goal has not yet been achieved or is a subgoal of a goal that has not yet been achieved;
   (b) all the members of rule C's conflict-goals-set have not yet been achieved or are subgoals of a goal that has not yet been achieved;
   (c) rule C's qualifier is true;
   (d) the truth of P implies the truth of some member M of C's conflict-goals-set;
   (e) except for M, all other members of rule C's conflict-goals-set, if any, are equivalent to, or are implied by, true and protectable conditions;
   (f) rule C's first-goal is not both true and protectable; and (g) rule C has a subgoal that is not both true and protectable; and when no said confinement rule in said set of confinement rules meets said criteria with respect to goal P, goal P is denoted as being achievable and protectable.

14. The reactive planning and plan execution method of claim 10, wherein said step of generating and storing confinement rules includes determining from said primitives whether each said goal for which confinement rules are being generated can be achieved when each potentially conflicting goal and each potential combination of potentially conflicting goals have been previously achieved, and generating said confinement rules with each rule's Conflict-Goals-Set equal to one of (A) a conflicting goal whose prior achievement and maintenance would prevent achievement of said each goal, and (B) a combination of conflicting goals whose prior achievement and maintenance would prevent achievement of said each goal.

15. The reactive planning and plan execution method of claim 14, wherein said step of generating confinement rules includes automatically generating subgoals for ones of said confinement rules by searching, with respect to each one confinement rule, for a chain of other confinement rules in said set of confinement rules which specify that achievement and maintenance of said one confinement rule's First-Goal could prevent achievement of any goal in said one confinement rule's Conflict-Goal-Set, and then adding a subgoal to said one confinement rule for each condition that would break said chain of other confinement rules so as to enable achievement of said goal in said one confinement rule's Conflict-Goal-Set.

16. The reactive planning and plan execution method of claim 10, wherein said step of generating and storing confinement rules includes comparing confinement pairs of confinement rules having overlapping Conflict-Goal-Sets, and adding said qualifier to the one of said pair of confinement rules having the larger Conflict-Goal-Set to limit said one confinement rule's applicability, wherein said added qualifier represents shared goals in said overlapping Conflict-Goal-Sets and such that said one confinement rule is applicable only when said added qualifier represents a condition that is true.

* * * * *